United States Patent
Maeda (10) Patent No.: US 11,378,034 B2
(45) Date of Patent: Jul. 5, 2022

(54) CONTROL DEVICE FOR FUEL SUPPLY SYSTEM

(71) Applicant: TOYOTA JIDOSHA KABUSHIKI KAISHA, Aichi-ken (JP)

(72) Inventor: Toshio Maeda, Okazaki (JP)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 0 days.

(21) Appl. No.: 17/335,073

(22) Filed: Jun. 1, 2021

(65) Prior Publication Data
US 2021/0381461 A1 Dec. 9, 2021

(30) Foreign Application Priority Data
Jun. 9, 2020 (JP) .............................. JP2020-100179

(51) Int. Cl.
  *F02D 41/22* (2006.01)
  *F02D 41/30* (2006.01)
  *F04D 15/02* (2006.01)
  *F04D 15/00* (2006.01)

(52) U.S. Cl.
  CPC ....... *F02D 41/221* (2013.01); *F02D 41/3082* (2013.01); *F04D 15/0066* (2013.01); *F04D 15/0272* (2013.01); *F02D 2041/226* (2013.01)

(58) Field of Classification Search
  CPC .............. F02D 41/221; F02D 41/3082; F02D 2041/226; F04D 15/0066; F04D 15/0272
  USPC .................................. 123/497; 701/103–107
  See application file for complete search history.

(56) References Cited

U.S. PATENT DOCUMENTS

| | | | | |
|---|---|---|---|---|
| 8,051,562 | B2* | 11/2011 | Sakai | F04D 5/002 |
| | | | | 29/888.02 |
| 2016/0265495 | A1* | 9/2016 | Nagata | F04D 29/0413 |
| 2018/0305539 | A1* | 10/2018 | Koizumi | C08K 3/013 |
| 2021/0056244 | A1* | 2/2021 | Sun | F04D 15/00 |

FOREIGN PATENT DOCUMENTS

JP    2019143527 A    8/2019

* cited by examiner

*Primary Examiner* — Hai H Huynh
(74) *Attorney, Agent, or Firm* — Hauptman Ham, LLP (57) ABSTRACT

A control device is applied to a fuel supply system including a fuel pump that rotates an impeller in a housing and pumps fuel from a fuel tank and a fuel pipe in which fuel discharged from the fuel pump flows. The control device controls the fuel pump. The control device includes an execution device and a storage device that stores a program of a process which is performed by the execution device. In the control device, the execution device performs a coping process of increasing an amount of operation of the impeller when the impeller is deformed and interference with the housing is detected in comparison with a case in which the interference is not detected.

5 Claims, 7 Drawing Sheets

| | | FUEL TEMPERATURE [°C] | | | |
|---|---|---|---|---|---|
| | | temp1 | temp2 | temp3 | temp4 |
| MINIMUM FUEL PRESSURE [kPa] | 300~ | temp1d | temp2d | temp3d | temp4d |
| | 200~299 | temp1c | temp2c | temp3c | temp4c |
| | 100~199 | temp1b | temp2b | temp3b | temp4b |
| | 0~99 | temp1a | temp2a | temp3a | temp4a |

FIG. 4

|  | | ELAPSED TIME [s] | | | |
| --- | --- | --- | --- | --- | --- |
|  | | time1 | time2 | time3 | time4 |
| MINIMUM FUEL PRESSURE [kPa] | 300~ | time1d | time2d | time3d | time4d |
| | 200~299 | time1c | time2c | time3c | time4c |
| | 100~199 | time1b | time2b | time3b | time4b |
| | 0~99 | time1a | time2a | time3a | time4a |

CONTROL DEVICE FOR FUEL SUPPLY SYSTEM

CROSS-REFERENCE TO RELATED APPLICATION

This application claims priority to Japanese Patent Application No. 2020-100179 filed on Jun. 9, 2020, incorporated herein by reference in its entirety.

BACKGROUND

1. Technical Field

The present disclosure relates to a control device for a fuel supply system.

2. Description of Related Art

A fuel supply system described in Japanese Unexamined Patent Application Publication No. 2019-143527 (JP 2019-143527 A) calculates a feedback correction value which is set based on a difference between a target fuel pressure and a detected fuel pressure in a state in which a pump voltage, a pump current, and a discharge flow rate from a fuel pump are set in a predetermined state. In the fuel supply system, the calculated feedback correction value is integrated and it is determined that the fuel pump is in a deteriorated state when the integrated value of the feedback correction value is equal to or greater than a threshold value. When it is determined that the fuel pump is in the deteriorated state, an alarm lamp is turned on.

SUMMARY

In the fuel supply system, it is determined that deterioration of the fuel pump is further progressing as the integrated value of the correction value in feedback control of the fuel pressure in a specific operating state increases. An alarm lamp is turned on to request maintenance.

Depending on a cause of an abnormality in which the fuel pressure is less than the target fuel pressure, the function of the fuel pump may be recovered according to a later drive mode of the fuel pump without performing maintenance.

Configurations for solving the aforementioned problems and operations and advantages thereof will be described below.

According to an aspect of the present disclosure, there is provided a control device for a fuel supply system, the control device being applied to a fuel supply system including a fuel pump that rotates an impeller in a housing and pumps fuel from a fuel tank and a fuel pipe in which fuel discharged from the fuel pump flows, the control device controlling the fuel pump. The control device includes an execution device and a storage device that stores a program of a process which is performed by the execution device. In the control device, the execution device performs a coping process of increasing an amount of operation of the impeller when the impeller is deformed and interference with the housing is detected in comparison with a case in which interference is not detected.

When the impeller has deteriorated, the impeller is deformed with an increase in fuel temperature and the impeller is not likely to rotate well due to interference with the housing. With the aforementioned configuration, when interference between the impeller and the housing is detected, the execution device performs the coping process of increasing an amount of operation of the impeller in comparison with the case in which interference is not detected. When the amount of operation of the impeller is increased in a state in which the impeller is interfering with the housing, wear of the impeller or the housing progresses, the interference is gradually reduced, and the state in which the impeller is not likely to rotate well is mitigated.

That is, with the aforementioned configuration, it is possible to mitigate a state in which the impeller is not likely to rotate well while continuously operating the fuel pump by performing the coping process.

In the control device for a fuel supply system according to the aspect, the execution device may increase the amount of operation of the impeller by increasing a lower limit of a rotation speed of the impeller in the coping process.

In the control device for a fuel supply system according to the aspect, the execution device may end the coping process and release the increase in the amount of operation of the impeller when a state in which the interference is detected is mitigated by performing the coping process.

When wear of the impeller or the housing progresses due to the amount of operation of the impeller being increased through the coping process, the interference is gradually reduced and the state in which the impeller is not likely to rotate well is mitigated. With the aforementioned configuration, when the state in which the impeller is not likely to rotate well is mitigated and the state in which interference is detected is resolved due to the state in which the impeller is not likely to rotate well being resolved, the coping process ends and the increase in the amount of operation of the impeller is released. Accordingly, it is possible to curb excessive operating of the impeller.

In the control device for a fuel supply system according to the aspect, the execution device may stop operating of the fuel pump during stop of fuel injection when interference with the housing is not detected, and prohibit the operating stop of the fuel pump and allow the impeller to operate continuously without stopping the operating of the fuel pump even during stop of fuel injection as the coping process when interference with the housing is detected.

With this configuration, the fuel pump can operate continuously to increase the amount of operation of the impeller by prohibiting the operating stop of the fuel pump. When the fuel pump is stopped and the impeller is stopped in a state in which the impeller interferes with the housing, the impeller has to rotate against static friction larger than dynamic friction during operating at the time of operating the fuel pump again thereafter. Accordingly, in some cases, when the impeller is stopped in a state in which the impeller is causing interference, the fuel pump may not be able to operate again. With this configuration, when the operating stop of the fuel pump is prohibited as a part of the coping process in a state in which interference is detected and the fuel pump operates continuously even in a state in which the injection of fuel is stopped, such a situation in which the fuel pump is not able to operate again may be avoided.

In the control device for a fuel supply system according to the aspect, the execution device may release the prohibition of the operating stop of the fuel pump in the coping process when a state in which interference is detected is resolved by performing the coping process.

When wear of the impeller or the housing progresses due to the amount of operation of the impeller being increased through the coping process, the interference is gradually reduced and the state in which the impeller is not likely to rotate well is mitigated. With the aforementioned configuration, when the state in which the impeller is not likely to rotate well is mitigated and the state in which interference is detected is resolved, the prohibition of the operating stop of the fuel pump is released. Accordingly, it is possible to curb excessive operating of the impeller.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, a control device for a fuel supply system according to an embodiment will be described with reference to FIGS. 1 to 10.

Figure 1:
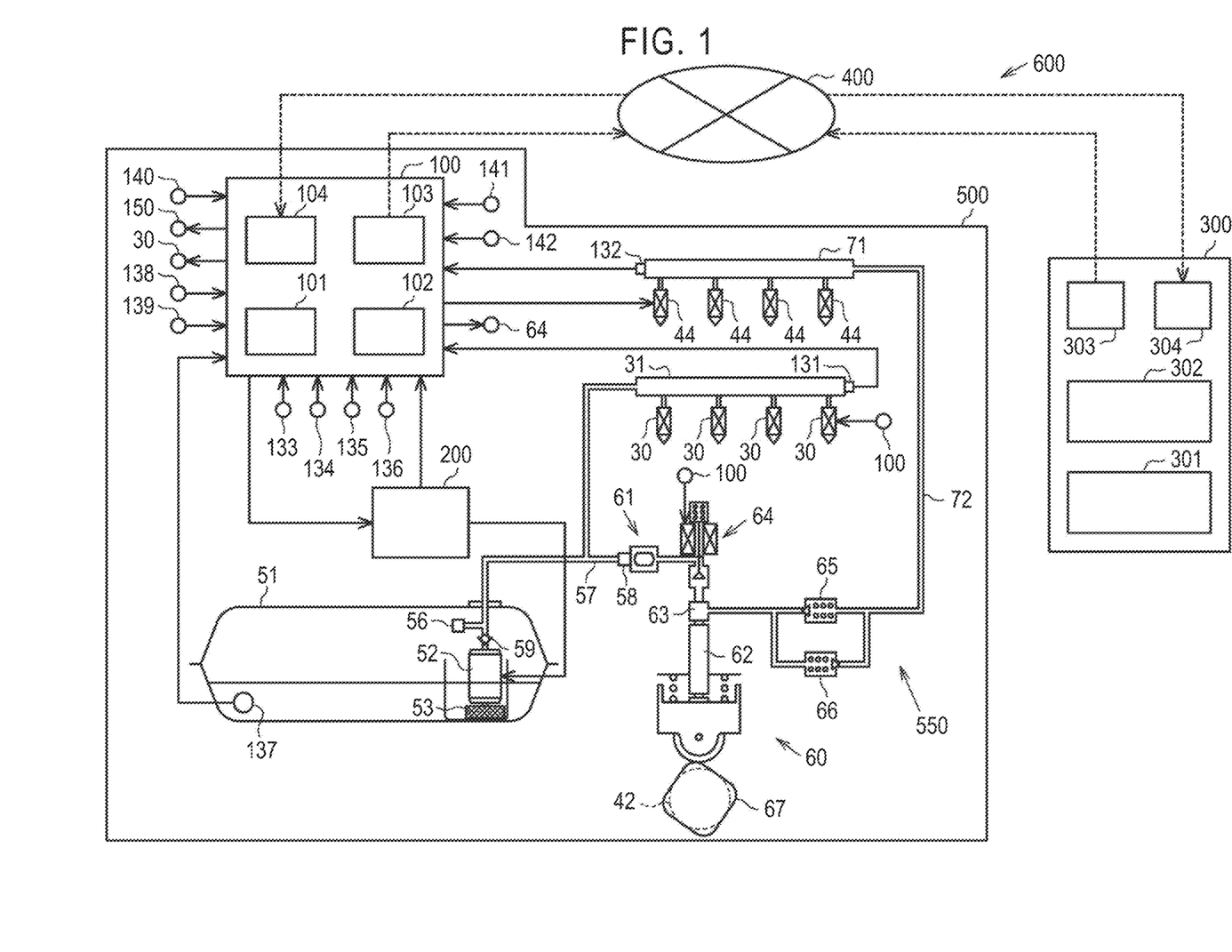
FIG. 1 is a diagram schematically illustrating a control device according to an embodiment, a fuel supply system which is controlled by the control device, and an abnormality diagnosis system.

FIG. 1 illustrates configurations of a control device for a fuel supply system according to this embodiment and a fuel supply system which is controlled by the control device. FIG. 1 also illustrates a relationship between the fuel supply system and an abnormality diagnosis system. The abnormality diagnosis system 600 is applied to a fuel supply system 550 of an onboard engine which is mounted in a vehicle 500.

As illustrated in FIG. 1, two fuel pumps including a fuel pump 52 that is installed inside a fuel tank 51 and a high-pressure fuel pump 60 that is installed outside the fuel tank 51 are provided in the fuel supply system 550 to which the abnormality diagnosis system 600 is applied. The fuel pump 52 is an electrical pump that rotates an impeller with a brushless motor. A cylinder fuel injection valve 44 and a port fuel injection valve 30 are provided in the fuel supply system 550. The cylinder fuel injection valve 44 is provided in each cylinder of an engine and injects fuel directly into each cylinder of the engine. The cylinder fuel injection valve 44 is connected to a high-pressure delivery pipe 71 that is a fuel accumulating container. The port fuel injection valve 30 injects fuel into an intake port connected to each cylinder of the engine. The port fuel injection valve 30 is connected to a low-pressure delivery pipe 31. The engine in which the fuel supply system 550 is mounted is an in-line four-cylinder engine, and four cylinder fuel injection valves 44 are connected to the high-pressure delivery pipe 71. Four port fuel injection valves 30 are also connected to the low-pressure delivery pipe 31.

A fuel pipe 57 that is a fuel passage for sending fuel from the fuel pump 52 to the high-pressure fuel pump 60 and the low-pressure delivery pipe 31 and a high-pressure fuel pipe 72 that is a fuel passage for sending fuel from the high-pressure fuel pump 60 to the high-pressure delivery pipe 71 are provided in the fuel supply system 550. The fuel pipe 57 branches in the middle thereof, one end thereof is connected to the high-pressure fuel pump 60, and the other end is connected to the low-pressure delivery pipe 31.

A fuel pressure sensor 131 that detects a pressure of fuel in the fuel pipe 57 and the low-pressure delivery pipe 31 is provided in the low-pressure delivery pipe 31. A fuel pressure sensor 132 that detects a high-side fuel pressure which is a pressure of fuel accumulated in the high-pressure delivery pipe 71 is provided in the high-pressure delivery pipe 71. The fuel pressure sensors 131, 132 express a fuel pressure as a gauge pressure with respect to atmospheric pressure.

The fuel pump 52 suctions fuel in the fuel tank 51 via an upstream filter 53 and sends the fuel to the fuel pipe 57 with supply of electric power. A relief valve 56 that is opened to relieve fuel from the fuel pipe 57 to the fuel tank 51 when a feed pressure Pf which is a pressure of fuel transmitted to the fuel pipe 57 by the fuel pump 52, that is, a fuel pressure in the fuel pipe 57, is greater than a predetermined valve opening pressure is provided in a part of the fuel pipe 57 located inside the fuel tank 51.

A check valve 59 that is provided with a fuel pump side as a lower side, sits on a valve seat below which a valve body is located with its weight, and is opened by a flow of fuel discharged from the fuel pump 52 is provided in a part of the fuel pipe 57 which is upstream from the part in which the relief valve 56 is provided. The check valve 59 is closed when the fuel pump 52 stops and supply of fuel stops.

The fuel pipe 57 is connected to the high-pressure fuel pump 60 via a downstream filter 58 that filters impurities in fuel flowing in the fuel pipe 57 and a pulsation damper 61 that decreases a pulsation in fuel pressure in the fuel pipe 57.

The high-pressure fuel pump 60 includes a plunger 62, a fuel chamber 63, an electromagnetic spill valve 64, a check valve 65, and a relief valve 66. The plunger 62 is driven to reciprocate by a pump cam 67 which is provided in a cam shaft 42 of an engine, and changes a volume of the fuel chamber 63 with the reciprocating movement thereof. The fuel chamber 63 is connected to the fuel pipe 57 via the electromagnetic spill valve 64.

The electromagnetic spill valve 64 is closed with supply of electric power thereto to cut off a flow of fuel between the fuel chamber 63 and the fuel pipe 57 and is opened with stop of the supply of electric power to permit a flow of fuel between the fuel chamber 63 and the fuel pipe 57. The check valve 65 permits discharge of fuel from the fuel chamber 63 to the high-pressure delivery pipe 71, and prohibits a back flow of fuel from the high-pressure delivery pipe 71 to the fuel chamber 63. The relief valve 66 is provided in a passage bypassing the check valve 65, and is opened to permit a back flow of fuel to the fuel chamber 63 when the pressure on the high-pressure delivery pipe 71 side increases excessively.

A fuel pressurizing operation of the high-pressure fuel pump 60 having the aforementioned configuration will be described below. In the high-pressure fuel pump 60, the volume of the fuel chamber 63 changes with reciprocation of the plunger 62. In the following description, the operation of the plunger 62 in a direction in which the volume of the fuel chamber 63 increases is referred to as descent of the plunger 62, and the operation of the plunger 62 in a direction in which the volume of the fuel chamber 63 decreases is referred to as ascent of the plunger 62.

In the high-pressure fuel pump 60, when the descent of the plunger 62 is started in a state in which the electromagnetic spill valve 64 is open, fuel flows into the fuel chamber 63 from the fuel pipe 57 with the increase in volume of the fuel chamber 63. When the electromagnetic spill valve 64 is maintained in an open state even after the plunger 62 has changed from the descent to the ascent, fuel flowing into the fuel chamber 63 during the descent of the plunger 62 is returned to the fuel pipe 57. When the electromagnetic spill valve 64 is closed during the ascent of the plunger 62 and the closed state of the electromagnetic spill valve 64 is maintained until the plunger 62 changes from the ascent to the descent, fuel in the fuel chamber 63 is pressurized with the decrease in volume of the fuel chamber 63 due to the ascent of the plunger 62. When the fuel pressure in the fuel chamber 63 is greater than the fuel pressure in the high-pressure fuel pipe 72, the check valve 65 is opened and the pressurized fuel in the fuel chamber 63 is delivered to the high-pressure fuel pipe 72. In this way, the high-pressure fuel pump 60 pressurizes fuel in the fuel pipe 57 and delivers the pressurized fuel to the high-pressure fuel pipe 72 whenever the plunger 62 reciprocates. By changing the closing time of the electromagnetic spill valve 64 during the ascent of the plunger 62, an amount of fuel which is delivered to the high-pressure fuel pipe 72 by the high-pressure fuel pump 60 in each pressurizing operation is increased or decreased.

The engine including the fuel supply system 550 is controlled by a control device 100. The control device 100 is a control device for an engine and also controls the fuel supply system 550 of the engine. That is, the control device 100 also serves as a control device for the fuel supply system 550.

The control device 100 includes an execution device 101 that performs various operation processes and a storage device 102 that stores control programs or data. The control device 100 also includes a transmitter 103 that transmits data via a communication network 400 and a receiver 104 that receives data via the communication network 400.

The control device 100 performs control of the engine including control of the fuel supply system 550 by causing the execution device 101 to read and execute a program stored in the storage device 102.

Detection signals of various sensors that detect an operating state of the engine are input to the control device 100. As illustrated in FIG. 1, a detection signal of an accelerator operation amount by a driver which is detected by an accelerator position sensor 142 and a detection signal of a vehicle speed which is a travel speed of the vehicle detected by a vehicle speed sensor 141 are input to the control device 100.

Other detection signals of various other sensors are input to the control device 100. For example, as illustrated in FIG. 1, in addition to the fuel pressure sensors 131, 132, an air flowmeter 133, a crank position sensor 134, a cam position sensor 135, and a coolant temperature sensor 136 are connected to the control device 100.

The air flowmeter 133 detects a temperature of air taken into the cylinders via an intake passage of the engine and an amount of intake air which is a mass of intake air. The crank position sensor 134 outputs a crank angle signal based on change in a rotational phase of a crank shaft which is an output shaft of the engine. The control device 100 calculates an engine rotation speed which is a rotation speed of the crank shaft per unit time based on the crank angle signal which is input from the crank position sensor 134.

The cam position sensor 135 outputs a cam angle signal based on change in a rotational phase of the cam shaft 42. The coolant temperature sensor 136 detects a coolant temperature which is a temperature of a coolant of the engine.

A fuel temperature sensor 137 that detects a fuel temperature Tf which is a temperature of fuel in the fuel tank 51, a fuel level sensor 138 that detects a height level of a fuel surface in the fuel tank 51 and outputs a detection signal indicating a residual amount of fuel, and an outside air temperature sensor 139 that detects an outside air temperature are also connected to the control device 100.

A main switch 140 of the vehicle and a display unit 150 are also connected to the control device 100. When an abnormality has occurred in the vehicle 500, the display unit 150 displays an icon or a sentence for notifying an occupant of the occurrence of the abnormality.

A fuel pump control device 200 that controls a pump rotation speed Np which is a number of rotations per unit time of the impeller of the fuel pump 52 is also connected to the control device 100. The fuel pump control device 200 increases or decreases the pump rotation speed Np by adjusting electric power supplied to the fuel pump 52 using pulse width modulation based on a command from the control device 100. The fuel pump control device 200 transmits information of a pump current Ip which is a current supplied to the fuel pump 52 and the pump rotation speed Np to the control device 100.

The control device 100 performs fuel injection control, fuel pressure variable control, and feed pressure control as parts of engine control.

At the time of fuel injection control, the control device 100 first calculates a required amount of injected fuel which is a required value of an amount of injected fuel of the cylinder fuel injection valve 44 and the port fuel injection valve 30 according to an engine operating state such as an engine rotation speed or a load factor of the engine. Subsequently, the control device 100 calculates an opening period of time of the cylinder fuel injection valve 44 and the port fuel injection valve 30 which are required for injection of fuel corresponding to the required amount of injected fuel. Then, the control device 100 operates the cylinder fuel injection valve 44 of each cylinder and the port fuel injection valve 30 to inject fuel in a period corresponding to the calculated opening period of time. The control device 100 also performs fuel-cut control for stopping injection of fuel to stop supply of fuel to a combustion chamber of the engine and achieving a decrease in a fuel consumption rate during deceleration in which the accelerator operation amount is "0" or the like as a part of fuel injection control. The control device 100 stops the operation of the fuel pump 52 when injection of fuel is stopped.

At the time of fuel pressure variable control, the control device 100 calculates a target value of a high-side fuel pressure based on the load factor of the engine and the like. The target value of the high-side fuel pressure is basically set to a low pressure when the load factor of the engine is low and a high pressure when the load factor of the engine is high. Then, the control device 100 adjusts an amount of delivered fuel of the high-pressure fuel pump 60 to decrease a difference between the detection value of the high-side fuel pressure from the fuel pressure sensor 132 and the target value of the high-side fuel pressure. Specifically, when the detection value of the high-side fuel pressure is lower than the target value, the closing time of the electromagnetic spill valve 64 in the ascent period of the plunger 62 is advanced to increase the amount of delivered fuel of the high-pressure fuel pump 60. When the detection value of the high-side fuel pressure is higher than the target value, the closing time of the electromagnetic spill valve 64 in the ascent period of the plunger 62 is delayed to decrease the amount of delivered fuel of the high-pressure fuel pump 60.

Details of a pressure adjusting process which is performed as a part of feed pressure control will be described below. The pressure adjusting process is performed for the following purposes. When fuel delivered from the fuel pump 52 and flowing in the fuel pipe 57 is heated by the engine and is increased in temperature, vapor may be generated in the fuel pipe 57 and supply of fuel to the high-pressure delivery pipe 71 or the low-pressure delivery pipe 31 may be delayed. Since a vaporization temperature of fuel increases as the fuel pressure increases, the amount of delivered fuel from the fuel pump 52 to the fuel pipe 57 may be increased to increase the feed pressure Pf in order to prevent generation of vapor in the fuel pipe 57. However, when the amount of delivered fuel is increased, power consumption in the fuel pump 52 is increased by as much. Therefore, in the pressure adjusting process, power consumption is curbed and generation of vapor is prevented by adjusting an amount of fuel discharged from the fuel pump 52 in order to keep the feed pressure Pf low as long as generation of vapor can be prevented.

Specifically, the execution device 101 of the control device 100 calculates a required feed pressure Pf* which is a target value of the feed pressure Pf based on the fuel temperature Tf detected by the fuel temperature sensor 137. The control device 100 changes the required feed pressure Pf* according to the fuel temperature Tf. The control device 100 increases the required feed pressure Pf* as the fuel temperature Tf increases such that the required feed pressure Pf* is not less than a saturated vapor pressure even when fuel with the highest saturated vapor pressure out of fuel which is assumed to be used is used. The execution device 101 calculates a required pump rotation speed Np* which is a target value of the pump rotation speed Np based on an amount of injected fuel Qf and the required feed pressure Pf*.

The amount of injected fuel Qf can be acquired based on the required amount of injected fuel calculated by the fuel injection control, that is, a sum of the required amount of injected fuel to the cylinder fuel injection valve 44 and the required amount of injected fuel to the port fuel injection valve 30.

In the control device 100, the execution device 101 calculates the pump rotation speed Np required for realizing the required feed pressure Pf* as the required pump rotation speed Np* in consideration of an amount of fuel consumed with execution of the fuel injection control. Specifically, the execution device 101 calculates the required pump rotation speed Np* with reference to an operation map which is stored in the storage device 102. This operation map is prepared to calculate the required pump rotation speed Np*, for example, based on results of experiment using gasoline as fuel. In the operation map, the required pump rotation speed Np* which is output increases as the required feed pressure Pf* increases and as the amount of injected fuel Qf increases.

The execution device 101 of the control device 100 calculates a correction value ΔN of the required pump rotation speed Np* based on the required feed pressure Pf* and the feed pressure Pf detected by the fuel pressure sensor 131. Specifically, when the feed pressure Pf is less than the required feed pressure Pf*, the execution device 101 increases the correction value ΔN by a predetermined value. On the other hand, when the feed pressure Pf is greater than the required feed pressure Pf*, the execution device 101 decreases the correction value ΔN by a predetermined value. Then, the execution device 101 corrects the required pump rotation speed Np* by adding the calculated correction value ΔN to the required pump rotation speed Np*. Accordingly, the required pump rotation speed Np* corrected using the correction value ΔN is input to the fuel pump control device 200. Then, the fuel pump control device 200 controls electric power supplied to the fuel pump 52 such that the input required pump rotation speed Np* is realized.

When the required pump rotation speed Np* increases, an amount of fuel discharged from the fuel pump 52 per unit time increases and thus the feed pressure Pf increases. On the other hand, when the required pump rotation speed Np* decreases, the amount of fuel discharged from the fuel pump 52 per unit time decreases and thus the feed pressure Pf decreases.

In this way, the feed pressure Pf is controlled in a feedback manner in the fuel supply system 550. The execution device 101 of the control device 100 controls electric power supplied to the fuel pump 52 such that the required feed pressure Pf* is realized through the pressure adjusting process.

When an abnormality occurs in the fuel supply system 550, the required feed pressure Pf* cannot be realized. Accordingly, the abnormality diagnosis system 600 collects information of the fuel supply system 550 and diagnoses an abnormality of the fuel supply system 550 using the server device 300 connected to the control device 100 via the communication network 400.

As illustrated in FIG. 1, the server device 300 includes an execution device 301 and a storage device 302 that stores control programs or data. The server device 300 also includes a transmitter 303 that transmits data to the receiver 104 of the control device 100 via the communication network 400 and a receiver 304 that receives data transmitted from the transmitter 103 of the control device 100 via the communication network 400.

When an abnormality occurs in the fuel supply system 550, the feed pressure Pf decreases and the feed pressure Pf may be less than the required feed pressure Pf*. In the abnormality diagnosis system 600, a failure spot in which a decrease of the feed pressure Pf occurs is determined out of three predetermined classifications and an abnormality of the fuel supply system 550 is diagnosed.

Specifically, in the abnormality diagnosis system 600, the execution device 301 of the server device 300 diagnoses whether an abnormality has occurred in the fuel supply system 550. When it is diagnosed that an abnormality has occurred, the execution device 301 determines which of deterioration of the impeller of the fuel pump 52, an operation failure of the check valve 59, and other abnormality which is not affected by the fuel temperature Tf is a cause of the abnormality and diagnoses that the abnormality has occurred.

Figure 2:
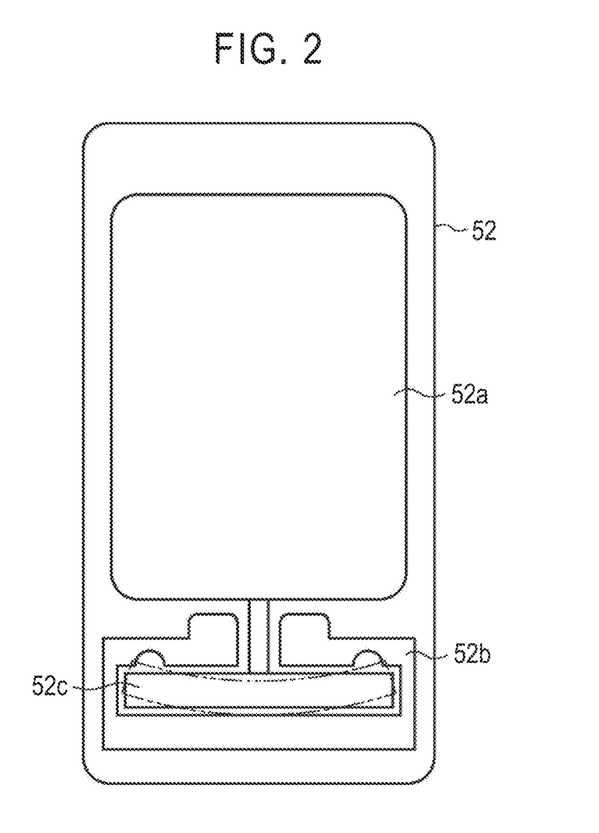
FIG. 2 is a diagram schematically illustrating a change of state of an impeller in a fuel pump.

As illustrated in FIG. 2, the fuel pump 52 pumps fuel by driving an impeller 52c accommodated in a housing 52b using a brushless motor 52a. The impeller 52c is formed of a resin and is deformed with an increase in temperature when it deteriorates with impregnation of fuel thereinto. As indicated by a two-dot chain line in FIG. 2, when the impeller 52c is deformed and is bent, the impeller 52c is less likely to rotate due to interference with the housing 52b. As a result, the decrease of the feed pressure Pf is caused. That is, the decrease of the feed pressure Pf due to such deterioration of the impeller 52c is more likely to occur when the fuel temperature Tf is high.

As illustrated in FIG. 1, the check valve 59 is disposed downstream from the fuel pump 52. When the check valve 59 is not appropriately opened due to an operation failure of the check valve 59, the decrease of the feed pressure Pf also occurs. Such an operation failure of the check valve 59 is likely to occur when the fuel temperature Tf is low or immediately after the fuel pump 52 starts operating.

In this way, the decrease of the feed pressure Pf due to the deterioration of the impeller 52c or the decrease of the feed pressure Pf due to the operation failure of the check valve 59 is affected by the fuel temperature Tf. On the other hand, there is also an abnormality of which trends of an occurrence frequency do not change depending on whether the fuel temperature Tf is high or low and which is not affected by the fuel temperature Tf. In the abnormality diagnosis system 600, the execution device 301 collects the occurrence frequency of the decrease in fuel pressure in the fuel supply system 550 and classifies an abnormality which is not affected by the fuel temperature Tf as other abnormality. The other abnormality which is not affected by the fuel temperature Tf includes, for example, breakage of the fuel pipe 57.

In the abnormality diagnosis system 600, specifically, the control device 100 mounted in a vehicle 500 monitors the feed pressure Pf in one trip after the main switch 140 has been turned on and until it is turned off, and stores a minimum fuel pressure in the one trip and data indicating a state when the minimum fuel pressure was recorded as diagnosis data in the storage device 102.

The control device 100 stores the fuel temperature Tf when the minimum fuel pressure has been recorded and an elapsed time after the fuel pump 52 was started and until the minimum fuel pressure was recorded in the trip in addition to the value of the minimum fuel pressure as the data indicating the state when the minimum fuel pressure was recorded in the trip in the storage device 102. In the abnormality diagnosis system 600, when the main switch 140 is turned off and one trip ends, the control device 100 transmits the diagnosis data to the server device 300 via the transmitter 103.

The server device 300 receives the diagnosis data transmitted from the control device 100 using the receiver 304. The server device 300 stores the received diagnosis data in the storage device 302, collects the diagnosis data, and prepares collection data which is used for the diagnosis process. That is, in the server device 300, the execution device 301 updates the collection data stored in the storage device 302 whenever the diagnosis data is received by the receiver 304. The preparation of collection data is performed for each vehicle 500, that is, for each fuel supply system 550. The diagnosis process is performed individually for the fuel supply system 550 of each vehicle 500 using the collection data which is prepared for each vehicle 500.

Figure 3:
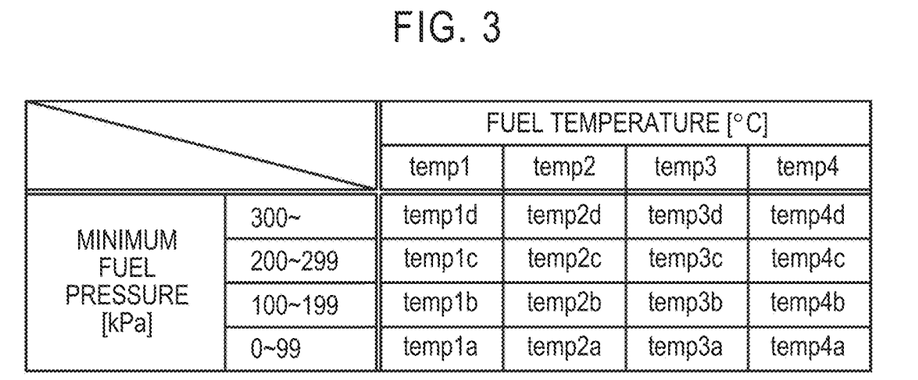
FIG. 3 is a table illustrating collection data which is acquired by collecting a frequency at which a minimum fuel pressure was recorded according to a combination of a minimum fuel pressure and a fuel temperature.
Figure 4:
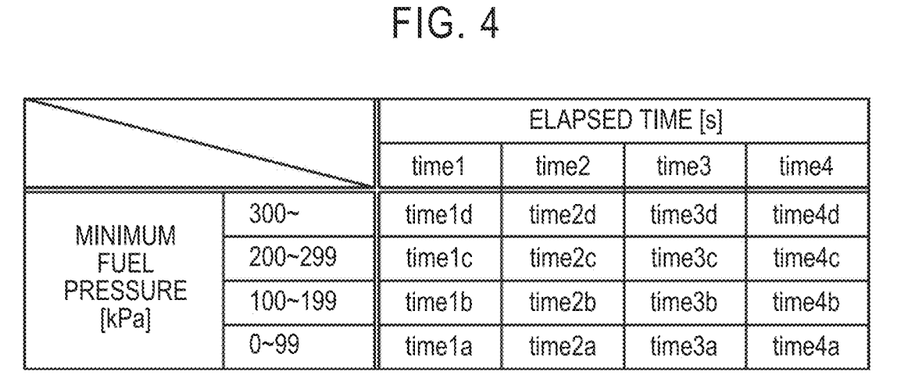
FIG. 4 is a table illustrating collection data which is acquired by collecting a frequency at which a minimum fuel pressure was recorded according to a combination of a minimum fuel pressure and an elapsed time after a fuel pump was started.

The abnormality diagnosis system 600 prepares first collection data which is obtained by collecting the frequency in which the minimum fuel pressure was recorded according to a combination of the minimum fuel pressure and the fuel temperature Tf as illustrated in FIG. 3 and second collection data which is obtained by collecting the frequency in which the minimum fuel pressure was recorded according to a combination of the minimum fuel pressure and the elapsed time after the fuel pump 52 was started as illustrated in FIG. 4.

As illustrated in FIG. 3, in the abnormality diagnosis system 600, the minimum fuel pressure is classified into four areas of "0 kPa to 99 kPa," "100 kPa to 199 kPa," "200 kPa to 299 kPa," and "300 kPa and greater" depending on the magnitude of the minimum fuel pressure in the first collection data. As illustrated in FIG. 3, in the abnormality diagnosis system 600, the fuel temperature Tf is classified into four areas of a "first temperature area temp1," a "second temperature area temp2," a "third temperature area temp3," and a "fourth temperature area temp4" depending on the magnitude of the fuel temperature Tf in the first collection data. The "first temperature area temp1" is a temperature area corresponding to a case in which the fuel temperature Tf when the minimum fuel pressure has been recorded is, for example, lower than 30° C. The "second temperature area temp2" is a temperature area corresponding to a case in which the fuel temperature Tf when the minimum fuel pressure has been recorded is, for example, equal to or higher than 30° C. and lower than 40° C. The "third temperature area temp3" is a temperature area corresponding to a case in which the fuel temperature Tf when the minimum fuel pressure has been recorded is, for example, equal to or higher than 40° C. and lower than 50° C. The "fourth temperature area temp4" is a temperature area corresponding to a case in which the fuel temperature Tf when the minimum fuel pressure has been recorded is, for example, equal to or higher than 50° C.

As illustrated in FIG. 3, in the first collection data corresponding to combinations of the minimum fuel pressure and the fuel temperature Tf, the frequency in which the minimum fuel pressure was recorded is collected in a total of 16 areas obtained by multiplying four areas based on the magnitude of the minimum fuel pressure by four areas based on the magnitude of the fuel temperature Tf.

For example, the abnormality diagnosis system 600 increments the frequency in the area "temp3d" by "1" and updates the collection data when the minimum fuel pressure in diagnosis data newly received by the server device 300 is equal to or greater than 300 kPa and the fuel temperature Tf when the minimum fuel pressure has been recorded is 45° C.

As illustrated in FIG. 4, the abnormality diagnosis system 600 classifies the elapsed time after the fuel pump 52 was started in each trip into four areas of a "first time area time1," a "second time area time2," a "third time area time3," and a "fourth time area time4" depending on the magnitude of the elapsed time in the second collection data. The "first time area time1" is a time area corresponding to a case in which the elapsed time when the minimum fuel pressure was recorded is, for example, less than 10 seconds. The "second time area time2" and the time areas subsequent thereto are time areas in which the ranges of the corresponding elapsed time are greater, for example, by several tens of seconds. That is, the "second time area time2" is a time area corresponding to a case in which the elapsed time when the minimum fuel pressure was recorded is, for example, equal to or greater than 10 seconds and less than several tens of seconds, and the "third time area time3" is a time area corresponding to a range of several tens of seconds after the "second time area time2." The "fourth time area time4" is a time area corresponding to a case in which the elapsed time when the minimum fuel pressure was recorded is, for example, greater than the elapsed time corresponding to the "third time area time3."

As illustrated in FIG. 4, in the second collection data corresponding to combinations of the minimum fuel pressure and the elapsed time, the frequency in which the minimum fuel pressure was recorded is collected in a total of 16 areas obtained by multiplying four areas based on the magnitude of the minimum fuel pressure by four areas based on the magnitude of the elapsed time.

For example, the abnormality diagnosis system 600 increments the frequency in the area "time2c" by "1" and updates the collection data when the minimum fuel pressure in diagnosis data newly received by the server device 300 is 250 kPa and the elapsed time when the minimum fuel pressure was recorded is 15 seconds.

When the diagnosis data for the fuel supply system 550 which is a diagnosis target is received a predetermined number of times, the server device 300 performs a diagnosis process on the fuel supply system 550 using the collection data. The predetermined number of times is, for example, several tens to one hundred and several tens. That is, the abnormality diagnosis system 600 diagnoses an abnormality of the fuel supply system 550 of the vehicle 500 whenever the number of trips of the vehicle 500 reaches several tens to one hundred and several tens.

Specifically, when diagnosis data which is not yet reflected in the diagnosis process is received the predetermined number of times, the server device 300 forms the first collection data and the second collection data into input data. Then, the server device 300 inputs the formed input data to a trained model generated through machine learning and performs the diagnosis process of the fuel supply system 550 using the trained model.

Figure 5:
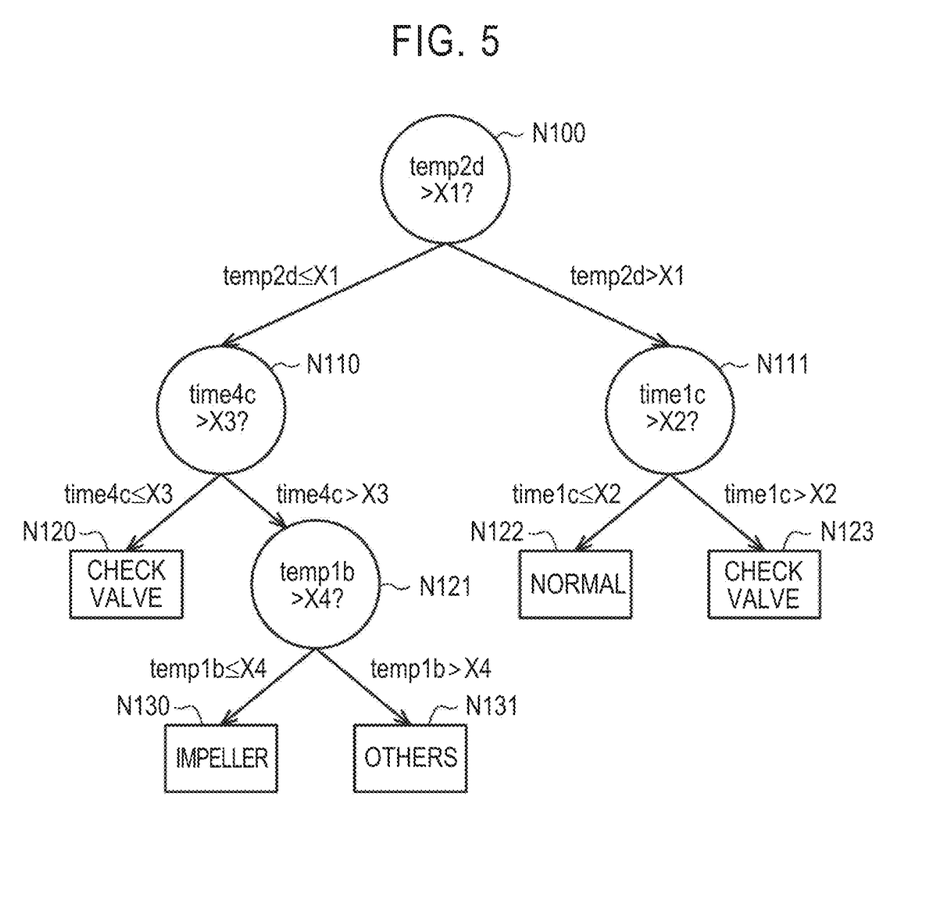
FIG. 5 is a diagram illustrating a decision tree which is used for a diagnosis process.

As illustrated in FIG. 5, the trained model in the abnormality diagnosis system 600 is a decision tree and is stored in the storage device 302 in advance. The trained model is a trained model which is trained by machine learning using training data in which a correct answer label is given to input data which has been converted to an occurrence ratio obtained by dividing the occurrence frequency stored in each area of the collection data by the total number of pieces of diagnosis data collected up to that time. The correct answer label is information indicating whether there is an abnormality associated with a decrease in feed pressure Pf and a type of a cause of the abnormality. Specifically, some labels including "normal" indicating that there is no abnormality, "impeller" indicating deterioration of the impeller 52c, "check valve" indicating the operation failure of the check valve 59, and "other" indicating another abnormality which is not affected by the fuel temperature Tf are given to the training data.

That is, the input data includes 32 numerical values including 16 numerical values indicating the ratio of the frequency in which the minimum fuel pressure was recorded in the 16 areas of the first collection data and 16 numerical values indicating the ratio of the frequency in which the minimum fuel pressure was recorded in the 16 areas of the second collection data. The training data includes 37 values including the 32 values and one value indicating one label of the four labels.

Generation of the trained model, that is, learning, is performed by inputting a data set which is a set of training data to a computer. The computer repeatedly performs search with a greedy method using a general algorithm which is used for learning of a decision tree and using the input data set and generates a decision tree such that a junction from which a larger amount of information is acquired is disposed at a higher position of a tree. The decision tree which is generated by performing learning in advance is stored as a trained model in the storage device 302 of the server device 300.

As illustrated in FIG. 5, the decision tree stored in the storage device 302 of the abnormality diagnosis system 600 includes nodes which branch depending on whether a numerical value included in the input data is greater than a threshold value and leaves indicating a diagnosis result.

In the decision tree, first, in node N100, the execution device 301 determines whether the value of "temp2d" in the input data is greater than a threshold value X1. When the value of "temp2d" in the input data is greater than the threshold value X1, the execution device 301 determines whether the value of "temp1c" in the input data is greater than a threshold value X2 in node N111. The threshold value X2 is a value less than the threshold value X1.

When it is determined in node N111 that the value of "temp1c" in the input data is greater than the threshold value X2, the execution device 301 diagnoses that an operation failure of the check valve 59 has occurred in leaf N123.

On the other hand, when it is determined in node N111 that the value of "temp1c" in the input data is equal to or less than the threshold value X2, the execution device 301 diagnoses that the fuel supply system 550 is normal in leaf N122.

When it is determined in node N100 that the value of "temp2d" in the input data is equal to or less than the threshold value X1, the execution device 301 determines whether the value of "time4c" in the input data is greater than a threshold value X3 in node N110. The threshold value X3 is a value less than the threshold value X2.

When it is determined in node N110 that the value of "time4c" in the input data is equal to or less than the threshold value X3, the execution device 301 diagnoses that an operation failure of the check valve 59 has occurred in leaf N120.

When it is determined in node N110 that the value of "time4c" in the input data is greater than the threshold value X3, the execution device 301 determines whether the value of "temp1b" in the input data is greater than a threshold value X4 in node N121. The threshold value X4 is a value less than the threshold value X3.

When it is determined in node N121 that the value of "temp1b" in the input data is greater than the threshold value X4, the execution device 301 determines that other abnormality which is not affected by the fuel temperature Tf has occurred in node N131.

When it is determined in node N121 that the value of "temp1b" in the input data is equal to or less than the threshold value X4, the execution device 301 diagnoses that deterioration of the impeller 52c has occurred in leaf N130.

In this way, in the abnormality diagnosis system 600, diagnosis data acquired by the control device 100 mounted in the vehicle 500 is transmitted to the server device 300 via the communication network 400. The server device 300 prepares input data using collection data obtained by collecting the diagnosis data, and diagnoses an abnormality of the fuel supply system 550 using a decision tree which is a trained model stored in the storage device 302. That is, in the abnormality diagnosis system 600, the control device 100 and the server device 300 which are connected to each other via the communication network 400 constitute the abnormality diagnosis system 600.

Details of routines which are performed by the control device 100 and the server device 300 in the abnormality diagnosis system 600 to realize the aforementioned diagnosis of an abnormality will be described below with reference to FIGS. 6 to 8.

Figure 6:
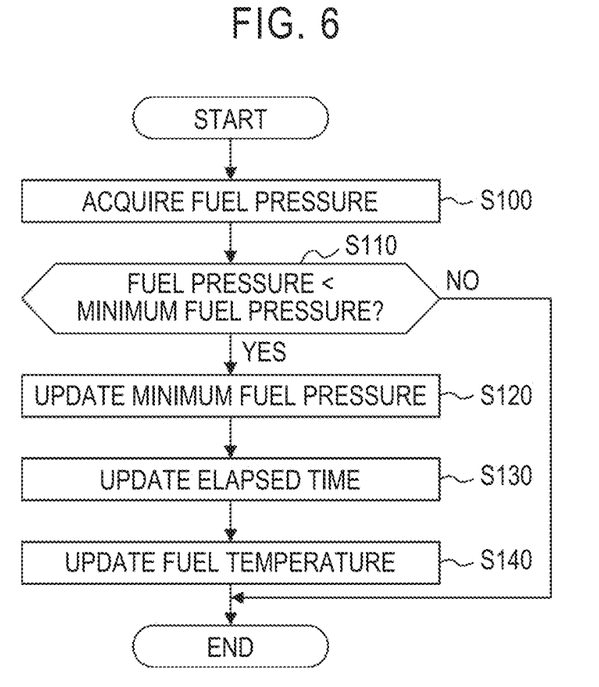
FIG. 6 is a flowchart illustrating a flow of a series of processes in a routine associated with acquisition of diagnosis data.

The routine illustrated in FIG. 6 is a routine associated with acquisition of diagnosis data which is performed by the execution device 101 of the control device 100 mounted in the vehicle 500. This routine is repeatedly performed by the execution device 101 while the fuel pump 52 is operating on the condition that a predetermined mask time has elapsed after the main switch 140 was turned on and the fuel pump 52 was started. The mask time is set to correspond to a time required for the feed pressure Pf to reach a predetermined level equal to or higher than 300 kPa in the fuel supply system 550 in a new-product state in which an abnormality has not occurred.

When the mask time elapses and this routine is started, the execution device 101 acquires a fuel pressure in the fuel pipe 57, that is, the feed pressure Pf, detected by the fuel pressure sensor 131. Then, in Step S110, the execution device 101 determines whether the feed pressure Pf which is the acquired fuel pressure is less than a minimum fuel pressure which is the lowest pressure out of the feed pressures Pf acquired in the same trip. As will be described later, the minimum fuel pressure is stored in the storage device 102. When the main switch 140 is turned on and the process of Step S110 is performed for the first time, the minimum fuel pressure is not recorded in the storage device 102 and thus the determination result of the process of Step S110 is positive.

When it is determined in the process of Step S110 that the feed pressure Pf is less than the minimum fuel pressure (Step S110: YES), the execution device 101 causes the routine to proceed to Step S120. Then, the execution device 101 updates the value of the minimum fuel pressure in the process of Step S120. That is, the execution device 101 stores the value of the newest feed pressure Pf acquired through the process of Step S100 as a new minimum fuel pressure in the storage device 102.

When the minimum fuel pressure is stored in this way, the execution device 101 updates the elapsed time after the fuel pump 52 was started in the process of Step S130. That is, the execution device 101 stores the elapsed time at that time as a new elapsed time in the storage device 102.

Then, the execution device 101 causes the routine to proceed to Step S130 and updates the fuel temperature Tf which is recorded as the diagnosis data. That is, the execution device 101 stores the fuel temperature Tf at that time as a new fuel temperature Tf in the storage device 102. When the minimum fuel pressure, the elapsed time when the minimum fuel pressure was recorded, and the fuel temperature Tf when the minimum fuel pressure was recorded are stored as the diagnosis data in the storage device 102 in this way, the execution device 101 temporarily ends this routine.

On the other hand, when it is determined in the process of Step S110 that the feed pressure Pf is equal to or greater than the minimum fuel pressure (Step S110: NO), the execution device 101 does not perform the processes of Steps S120 to S140 and temporarily ends this routine.

In this way, the control device 100 stores the minimum fuel pressure in each trip and the elapsed time and the fuel temperature Tf when the minimum fuel pressure was recorded as the diagnosis data in the storage device 102 by causing the execution device 101 to repeatedly perform the routine. Then, in the control device 100, when the main switch 140 is turned off and the trip ends, the execution device 101 causes the transmitter 103 to transmit the diagnosis data stored in the storage device 102.

Figure 7:
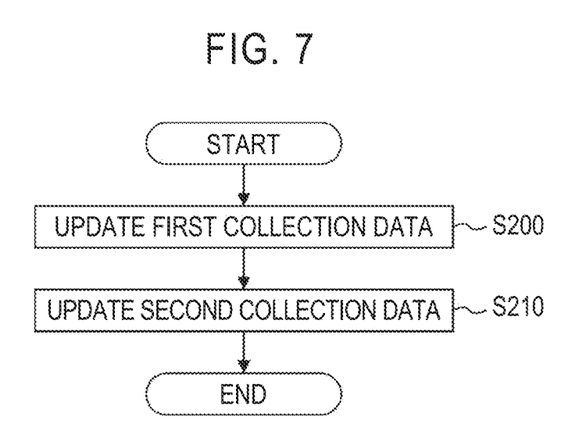
FIG. 7 is a flowchart illustrating a flow of a series of processes in a routine associated with update of collection data.
Figure 8:
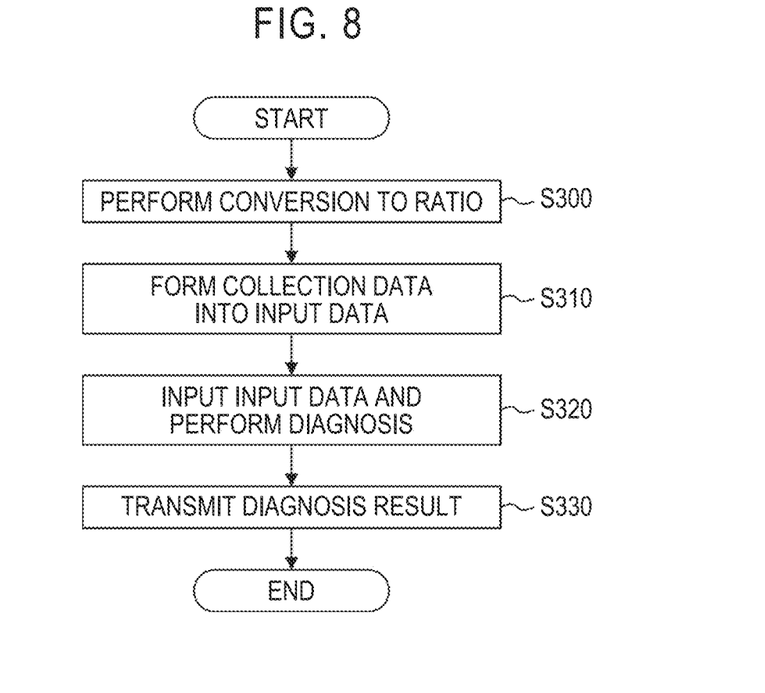
FIG. 8 is a flowchart illustrating a flow of a series of processes in a routine associated with a diagnosis process.

When the diagnosis data transmitted from the transmitter 103 of the control device 100 in this way is received, the execution device 301 of the server device 300 performs the routine illustrated in FIG. 7. When this routine is started, the execution device 301 first updates the first collection data stored in the storage device 302 in the process of Step S200. As described above with reference to FIG. 3, the first collection data is data obtained by collecting the frequency in which the minimum fuel pressure was recorded according to combinations of the minimum fuel pressure and the fuel temperature Tf. In the process of Step S200, the execution device 301 increments the frequency in a corresponding area in the first collection data by "1" based on the received diagnosis data.

For example, when the value of the minimum fuel pressure in the received diagnosis data is 240 kPa, the elapsed time is 15 seconds, and the fuel temperature Tf is 35° C., the execution device 301 increments the frequency in "temp2c" of the first collection data by "1" in the process of Step S200 to update the first collection data.

Then, the execution device 301 causes the routine to proceed to Step S210, and updates the second collection data stored in the storage device 302 in the process of Step S210. As described above with reference to FIG. 4, the second collection data is data obtained by collecting the frequency in which the minimum fuel pressure was recorded according to combinations of the minimum fuel pressure and the elapsed time when the minimum fuel pressure was recorded. In the process of Step S210, the execution device 301 increments the frequency in the corresponding area of the second collection data by "1" based on the received diagnosis data.

For example, when the value of the minimum fuel pressure in the received diagnosis data is 240 kPa, the elapsed time is 15 seconds, and the fuel temperature Tf is 35° C., the execution device 301 increments the frequency in "time2c" of the first collection data by "1" in the process of Step S210 to update the second collection data. When the second collection data is updated in this way, the execution device 301 ends this routine. The server device 300 updates the collection data in this way whenever diagnosis data is received.

A routine associated with a diagnosis process which is performed by the server device 300 will be described below with reference to FIG. 8. As described above, the server device 300 performs the diagnosis process whenever the diagnosis data for the fuel supply system 550 to be diagnosed is received a predetermined number of times.

Specifically, when the diagnosis data is received a predetermined number of times, the execution device 301 of the server device 300 performs this routine and performs the diagnosis process. When this routine is started, the execution device 301 first converts the values of the frequencies in the first collection data and the second collection data to ratios in the process of Step S300. That is, the execution device 301 prepares collection data obtained by converting an occurrence frequency of the minimum fuel pressure stored in each area of the collection data stored in the storage device 302 to an occurrence ratio obtained by dividing the occurrence frequency by the total number of pieces of diagnosis data collected up to now. For example, when the predetermined number of times is 100 and the total number of pieces of diagnosis data collected when the routine is being performed is 200, the first collection data and the second collection data corresponding to the occurrence frequency of 200 are stored. In this case, the execution device 301 calculates the occurrence ratio which is a share of division of the occurrence frequency stored in each area by "200" and prepares collection data in which the occurrence ratio in each area is stored.

When the occurrence frequency in the collection data is converted to a ratio in this way, the execution device 301 causes the routine to proceed to Step S310, and the execution device 301 forms the collection data including the ratios into input data in the process of Step S310. The input data is data which is input to the trained model stored in the storage device 302 described above with reference to FIG. 5.

In the process of Step S310, the execution device 301 forms a set of 32 numerical values including values of the areas of the first collection data and the second collection data which have been converted to the ratios into one piece of input data.

Then, the execution device 301 causes the routine to proceed to Step S320, and the execution device 301 performs the diagnosis process by inputting the formed input data to the trained model stored in the storage device 302. In the process of Step S330, the execution device 301 transmits the diagnosis result of diagnosis using the trained model to the vehicle 500 in which the fuel supply system 550 to be diagnosed is mounted via the transmitter 303. When the diagnosis result is transmitted in this way, the execution device 301 ends this routine.

In this way, in the abnormality diagnosis system 600, the control device 100 mounted in the vehicle 500 includes the storage device 102 that stores diagnosis data and the transmitter 103 that transmits the diagnosis data, and serves as a data transmitting device. The server device 300 includes the execution device 301 that performs the diagnosis process, the storage device 302 that stores the trained model, and the receiver 304 that receives the diagnosis data, and serves as an abnormality diagnosis device.

When the diagnosis result is received by the receiver 104, the execution device 101 of the control device 100 operates the display unit 150 based on the diagnosis result. When the received diagnosis result indicates that deterioration of the impeller has occurred, the execution device 101 causes the display unit 150 to display information indicating that an abnormality has occurred in the fuel pump 52. On the other hand, when the received diagnosis result indicates that an operation failure of the check valve 59 has occurred, the execution device 101 causes the display unit 150 to display information indicating that an abnormality has occurred in the check valve 59. When the received diagnosis result indicates the other abnormality, the execution device 101 causes the display unit 150 to display information indicating that an abnormality has occurred in the fuel supply system. When the diagnosis result indicates normality, the execution device 101 does not particularly operate the display unit 150.

The control device 100 detects that the impeller 52c has been deformed and interferes with the housing 52b based on the received result of diagnosis indicating that deterioration of the impeller 52c has occurred. When it is detected that the impeller 52c interferes with the housing, the execution device 101 of the control device 100 performs a coping process of increasing an amount of operation of the impeller 52c.

Figure 9:
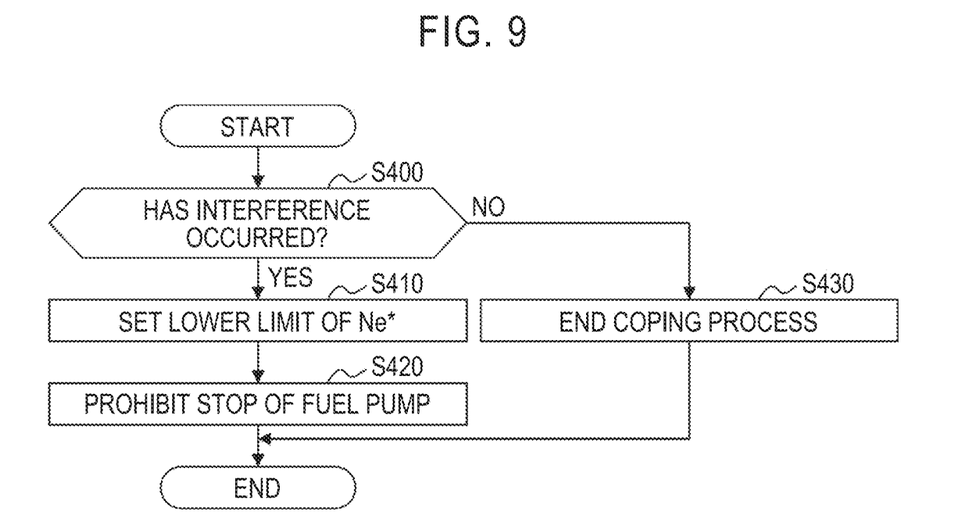
FIG. 9 is a flowchart illustrating a flow of a series of processes in a routine associated with a coping process.

The coping process will be described below with reference to FIGS. 9 and 10. The flowchart illustrated in FIG. 9 illustrates a flow of a series of processes in a routine associated with the coping process which is performed by the execution device 101. This routine is repeatedly performed by the execution device 101 when the main switch 140 is turned on.

When this routine is started, the execution device 101 first determines whether the impeller 52c interferes with the housing 52b in the process of Step S400. As described above, the execution device 101 detects that the impeller 52c interferes with the housing 52b based on the result of diagnosis indicating that deterioration of the impeller 52c has occurred. Accordingly, when it has been diagnosed through the diagnosis process that deterioration of the impeller 52c has occurred, the determination result of the process of Step S400 is positive. On the other hand, when it has not been diagnosed through the diagnosis process that deterioration of the impeller 52c has occurred, interference of the impeller 52c is not detected and thus the determination result of the process of Step S400 is negative.

When it is determined in the process of Step S400 that the impeller 52c interferes with the housing 52b (Step S400: YES), the execution device 101 causes the routine to proceed to Step S410. Then, in the process of Step S410, the execution device 101 sets a lower limit of the required pump rotation speed Np* in a part of the coping process.

The lower limit which is set herein has a relatively large value which is calculated through feed pressure control when the required feed pressure Pf* is high or when the amount of injected fuel Qf is large, and has a large value which is not necessary when the required feed pressure Pf* is low or when the amount of injected fuel Qf is small.

Then, the execution device 101 causes the routine to proceed to Step S420. In the process of Step S420, the execution device 101 prohibits the operation of the fuel pump 52 from being stopped due to stop of fuel injection in a part of the coping process. That is, when the fuel pump 52 is prohibited from being stopped through the process of Step S420, the fuel pump 52 is continuously driven even when fuel injection is stopped until the prohibition is released. When the fuel pump 52 is continuously driven in a state in which fuel injection is stopped, the feed pressure Pf increases. However, since the relief valve 56 is opened when the feed pressure Pf is greater than a predetermined valve opening pressure, the feed pressure Pf is maintained at the level of the valve opening pressure.

When the processes of Steps S410 and S420 are performed as a part of the coping process in this way and setting of the lower limit of the required pump rotation speed Np* and prohibition of stop of the fuel pump 52 are performed, the execution device 101 temporarily ends this routine.

On the other hand, when it is determined in the process of Step S400 that the impeller 52c does not interfere with the housing 52b (Step S400: NO), that is, when it has not been diagnosed that deterioration of the impeller 52c has occurred, the execution device 101 causes the routine to proceed to Step S430.

In the process of Step S430, the execution device 101 ends the coping process. That is, in the process of Step S430, the execution device 101 ends the coping process by releasing the lower limit of the required pump rotation speed Np* which has been set as a part of the coping process and releasing prohibition of the stop of the fuel pump 52. When the coping process is not performed, no operation is performed by the execution device 101 in the process of Step S430. When the process of Step S430 is performed in this way, the execution device 101 temporarily ends this routine.

Operations of the control device 100 according to this embodiment that performs the coping process will be described below with reference to FIG. 10. FIG. 10 illustrates a graph representing a relationship between the amount of injected fuel Qf and the required pump rotation speed Np* when the required feed pressure Pf* is constant. In FIG. 10, the relationship between the amount of injected fuel Qf and the required pump rotation speed Np* when the coping process is not performed and the lower limit of the required pump rotation speed Np* is not set is indicated by a solid line L1. On the other hand, a solid line L2 in FIG. 10 indicates the relationship between the amount of injected fuel Qf and the required pump rotation speed Np* when the lower limit of the required pump rotation speed Np* is set through the coping process. In FIG. 10, for the purpose of convenience of description, the solid line L2 is slightly deviated upward such that the solid line L2 is prevented from overlapping the solid line L1.

Figure 10:
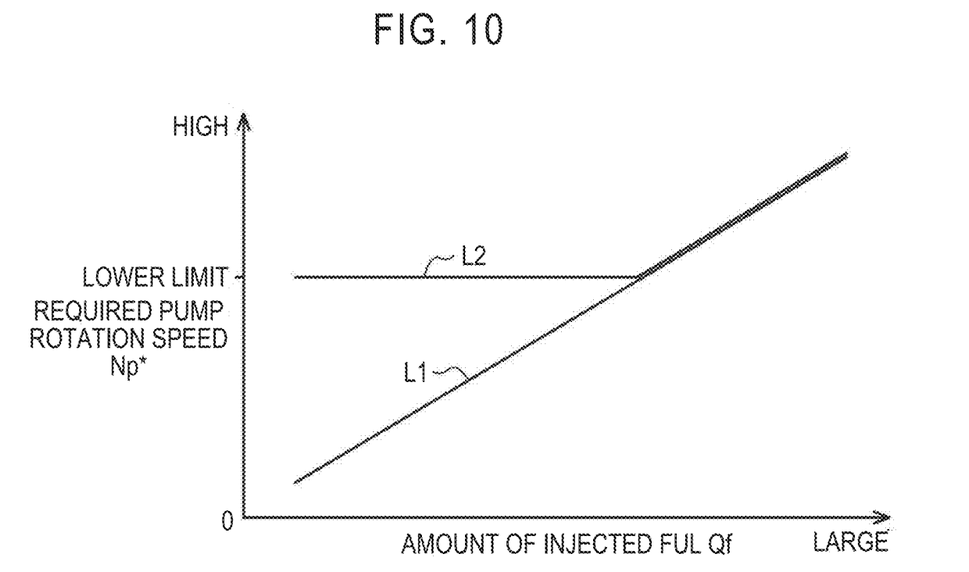
FIG. 10 is a graph illustrating a relationship between an amount of injected fuel and a required pump rotation speed and the relationship when a lower limit of the required pump rotation speed is set.

As indicated by the solid line L1 in FIG. 10, when interference of the impeller 52c is not detected, the coping process is not performed, and the required feed pressure Pf* is kept constant, the required pump rotation speed Np* increases as the amount of injected fuel Qf increases. These trends do not change even when the required feed pressure Pf* changes, and the required pump rotation speed Np* increases as the required feed pressure Pf* further increases.

On the other hand, when interference of the impeller 52c is detected and the coping process is being performed, a lower limit is set for the required feed pressure Pf* as indicated by the solid line L2 in FIG. 10 and thus the required feed pressure Pf* is not less than the lower limit. Accordingly, in an area in which the amount of injected fuel Qf is small, the required pump rotation speed Np* which is indicated by the solid line L2 when the coping process is performed is greater than the required pump rotation speed Np* which is indicated by the solid line L1 when the coping process is not performed.

In this way, by performing the coping process when interference of the impeller 52c is detected, the required pump rotation speed Np* becomes greater than that when interference of the impeller 52c is not detected, and the amount of operation of the impeller 52c increases.

As described above, operating stop of the fuel pump 52 is prohibited when interference of the impeller 52c is detected and the coping process is being performed. Accordingly, the fuel pump 52 is continuously driven without stopping even when the injection of fuel is being stopped. Accordingly, the amount of operation of the impeller 52c also becomes greater than that when interference of the impeller 52c is not detected.

When deterioration of the impeller 52c progresses, the impeller 52c is deformed with an increase of the fuel temperature Tf and the impeller 52c is not likely to rotate well due to interference with the housing 52b. As described above, the control device 100 increases the amount of operation of the impeller 52c in a state in which the impeller 52c interferes with the housing 52b. When the amount of operation of the impeller 52c is increased in this way, wear of the impeller 52c or the housing 52b progresses, the interference is gradually reduced, and the state in which the impeller 52c is not likely to rotate well is mitigated.

When it is not diagnosed that deterioration of the impeller 52c has occurred while the diagnosis process is being repeatedly performed and thus interference of the impeller 52c is not detected, the execution device 101 of the control device 100 ends the coping process. Accordingly, the increase of the amount of operation of the impeller 52c ends.

Advantages of this embodiment will be described below.
(1) With the control device 100, by performing the coping process, the state in which the impeller 52c is not likely to rotate well can be mitigated while continuously driving the fuel pump 52.
(2) When interference with the housing 52b is not detected, the execution device 101 of the control device 100 stops operating of the fuel pump 52 while the injection of fuel is being stopped. On the other hand, when interference with the housing 52b is detected, the execution device 101 prohibits operating stop of the fuel pump 52 as the coping process such that operating of the fuel pump 52 is not stopped and the impeller 52c is continuously operating even when the injection of fuel is being stopped.

Accordingly, the fuel pump 52 can operate continuously to increase the amount of operation of the impeller 52c by prohibiting operating stop of the fuel pump 52.
(3) When the fuel pump 52 is stopped and the impeller 52c is stopped in the state in which the impeller 52c interferes with the housing 52b, the impeller 52c has to rotate against static friction larger than dynamic friction during operating at the time of operating the fuel pump 52 again thereafter. Accordingly, in some cases, when the impeller 52c is stopped in the state in which the impeller is causing interference, the fuel pump 52 may not be able to operate again. With the control device 100, when the operating stop of the fuel pump 52 is prohibited as a part of the coping process in a state in which interference is detected such that the fuel pump 52 operates continuously even in the state in which the injection of fuel is being stopped, such a situation in which the fuel pump is not able to operate again may be avoided.
(4) When wear of the impeller 52c or the housing 52b progresses due to the amount of operation of the impeller 52c being increased through the coping process, the interference is gradually reduced and the state in which the impeller 52c is not likely to rotation well is mitigated. With the control device 100, when the state in which the impeller 52c is not likely to rotation well is mitigated and the state in which interference is detected is resolved, prohibition of the operating stop of the fuel pump 52 is released. Accordingly, it is possible to curb excessive operating of the impeller 52c.
(5) With the control device 100, since the state in which the impeller 52c is not likely to rotation well is mitigated and the state in which the impeller 52c is not likely to rotation well is mitigated, the coping process is ended to release the increase of the amount of operation of the impeller 52c when the state in which the interference is detected is mitigated. Accordingly, it is also possible to curb excessive operating of the impeller 52c.

This embodiment can be modified as follows. The embodiment and the following modified examples can be combined unless technical confliction arises.

In the aforementioned example of the coping process, the lower limit of the required pump rotation speed Np* is set and the fuel pump 52 is prohibited from being stopped, but a specific method of increasing the amount of operation of the impeller 52c can be appropriately modified. For example, the process of prohibiting the fuel pump 52 from being stopped may be skipped and only the process of setting the lower limit of the required pump rotation speed Np* may be performed. The process of setting the lower limit of the required pump rotation speed Np* may be skipped and only the process of prohibiting the fuel pump 52 from being stopped may be performed. As long as the amount of operation of the impeller 52c can increase, a process of performing a correction process of increasing the required pump rotation speed Np* or the like may be performed instead of the process of setting the lower limit of the required pump rotation speed Np* or the process of prohibiting the fuel pump 52 from being stopped.

The mode of releasing the coping process may be appropriately modified. For example, only the prohibition of stopping of the fuel pump 52 may be released or only setting of the lower limit of the required pump rotation speed Np* may be released.

In the aforementioned example of the abnormality diagnosis system, the trained model is a decision tree, but the trained model which is used for the diagnosis process may not be necessarily a decision tree. For example, the trained model which is used for the diagnosis process may be a random forest that determines a result of a diagnosis by majority of a plurality of decision trees. The trained model which is used for the diagnosis process may be a neural network illustrated in FIG. 11.

Figure 11:
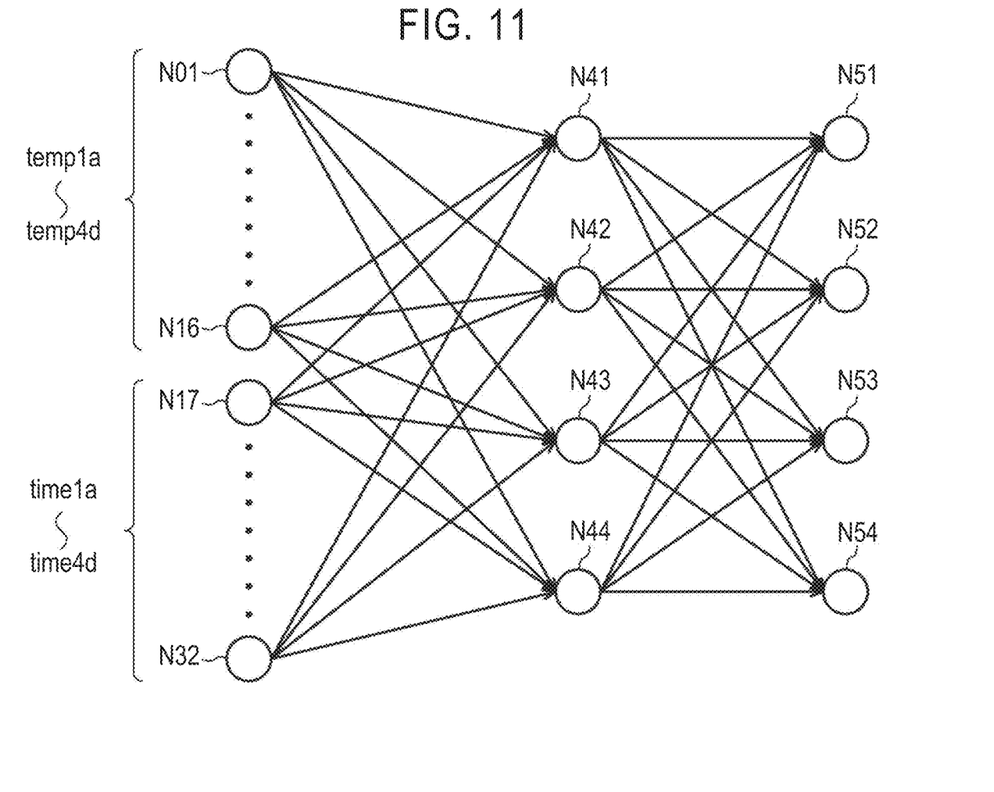
FIG. 11 is a diagram illustrating a neural network which is used for a diagnosis process in an abnormality diagnosis system according to a modified example.

In the example illustrated in FIG. 11, the neural network includes an input layer including 32 nodes (nodes N01 to N32) to which a value obtained by converting the occurrence frequency in each area of the first collection data to a ratio and a value obtained by converting the occurrence frequency in the corresponding area of the second collection data to a ratio are input. This neural network includes an intermediate layer including four nodes (nodes N41 to N44) and an output layer including four nodes (nodes N51 to N54).

In the neural network illustrated in FIG. 11, an activation function of the intermediate layer is a sigmoid function. An input to the intermediate layer is calculated as a sum of values obtained by multiplying the 32 input values to the input layer by weights. Sums of values obtained by multiplying the output values of the nodes (nodes N41 to N44) of the intermediate layer by weights are input to the output layer. The input values to the output layer are input to an output layer which is a softmax layer and is converted to output values corresponding to the nodes (N51 to N54). The sum of the output values of the nodes (nodes N51 to N54) of the output layer is "1" and the output values represent proportions with respect to "1." The nodes (nodes N51 to N54) of the output layer correspond to the results of diagnosis output through the diagnosis process. The type of the result of diagnosis is the same as in the abnormality diagnosis system 600. For example, node N51 corresponds to "normal," and node N52 corresponds to "deterioration of the impeller." Node N53 corresponds to an "operation failure of the check valve 59," and node N54 corresponds to "other abnormality." That is, the output layer outputs probabilities corresponding to four results of diagnosis including "normal," "deterioration of impeller," "operation failure of the check valve 59," and "other abnormality."

When supervised learning is performed by inputting the same training data as in the abnormality diagnosis system 600 to the neural network, a trained model that can diagnose an abnormality of the fuel supply system 550 can be generated using the same inputs as in the abnormality diagnosis system 600.

The neural network illustrated in FIG. 11 includes only a single intermediate layer, but the number of intermediate layers may be set to an arbitrary number equal to or greater than 2 and the number of nodes of the intermediate layer may be set to an arbitrary number.

Diagnosis of an abnormality is performed using the trained model which has been trained by machine learning, but the trained model which has been trained by machine learning may not be used. For example, it may be considered that threshold values of junctions are found by repeating experiment and verification and a model such as the decision tree described in the abnormality diagnosis system 600 is constructed.

Diagnosis of an abnormality is performed once based on the collection data obtained by collecting data of a predetermined number of trips, but diagnosis of an abnormality may be performed every trip based on a minimum fuel pressure and information when the minimum fuel pressure was recorded.

The fuel temperature Tf when the minimum fuel pressure was recorded is included in the diagnosis data, but a configuration in which diagnosis of an abnormality is performed without including the fuel temperature Tf in the diagnosis data may be employed.

Figure 12:
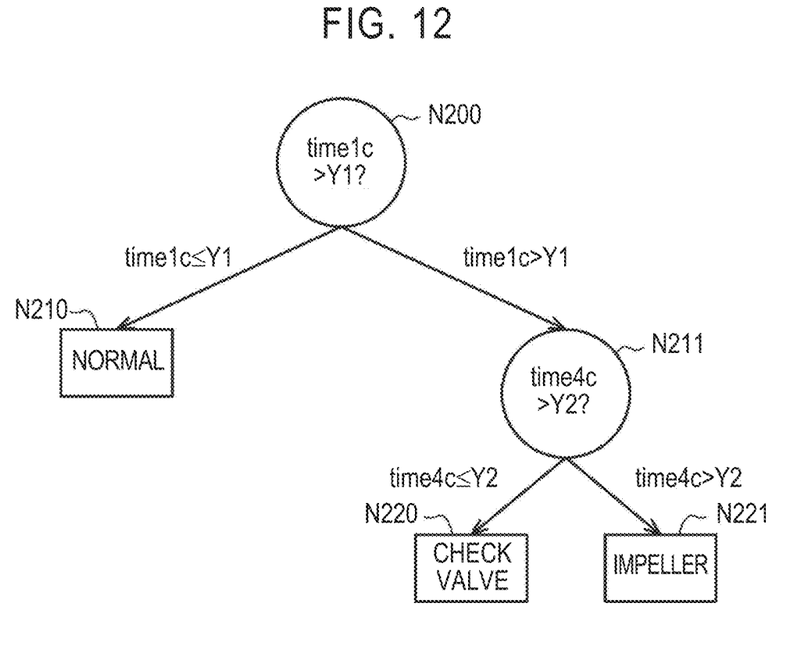
FIG. 12 is a diagram illustrating a decision tree which is used for a diagnosis process in an abnormality diagnosis system according to another modified example.

For example, a decision tree illustrated in FIG. 12 is an example of a decision tree that performs a diagnosis process based on only the second collection data. This decision tree can be generated by performing supervised learning using the second collection data and training data including 17 values of correct answer labels. Since information on the fuel temperature Tf is not included in the second collection data, an influence of the fuel temperature Tf is not considered in this decision tree. Accordingly, an output corresponding to "other abnormality" is not included in the output of the decision tree. That is, the labels in the training data include three types of "normal," "impeller," and "check valve," and the results of diagnosis output from the decision tree include three types of "normal," "deterioration of the impeller," and "operation failure of the check valve."

As illustrated in FIG. 12, in this decision tree, first, the execution device 301 determines whether "time1c" in the input data is greater than a threshold value Y1 in node N200. When "time1c" in the input data is equal to or less than the threshold value Y1, the execution device 301 determines that it is normal in leaf N210.

On the other hand, when "time1c" in the input data is greater than the threshold value Y1, the execution device 301 determines whether "time4c" in the input data is greater than a threshold value Y2 in node N211. The threshold value Y2 is a value less than the threshold value Y1.

When "time4c" in the input data is greater than the threshold value Y2, the execution device 301 determines that deterioration of the impeller 52c has occurred in leaf N221. On the other hand, when "time4c" in the input data is equal to or less than the threshold value Y2, the execution device 301 determines that the operation failure of the check valve 59 has occurred in leaf N220.

Details of the diagnosis data are not limited to the aforementioned examples. For example, diagnosis data not including information on the elapsed time when the minimum fuel pressure was recorded may be used. The information indicating the state when the minimum fuel pressure was recorded which is included in the diagnosis data may not be the fuel temperature Tf or the elapsed time.

The control device 100 which is a data transmitting device may perform collection of diagnosis data and the control device 100 may transmit collection data to the server device 300 via the transmitter 103. In this case, the server device 300 can prepare input data from the received collection data and perform the diagnosis process. Then, the control device 100 performs a coping process based on the result of diagnosis received from the server device 300.

The abnormality diagnosis system may include only the control device 100 mounted in the vehicle 500. That is, a trained model may be stored in the storage device 102 and the control device 100 may perform acquisition and collection of diagnosis data, preparation of input data, a diagnosis process, a coping process. Similarly to the aforementioned embodiment, the diagnosis data is transmitted from the control device 100, but the server device 300 may merely prepare collection data, collection data may be transmitted from the server device 300 to the control device 100, and the control device 100 may perform the diagnosis process.

The control device 100 controls the fuel pump 52 via the fuel pump control device 200, but a configuration in which a single control device has the functions of both the control device 100 and the fuel pump control device 200 may be employed. The control device for the fuel supply system 550 may be constituted by three or more units.

In the aforementioned embodiments, it is notified that an abnormality has occurred using visual information by operating the display unit 150, but the applicable embodiment is not limited thereto. For example, it may be notified that an abnormality has occurred using auditory information by operating a speaker.

The execution device 101 or the execution device 301 is not limited to an execution device that performs software processes. For example, a dedicated hardware circuit (for example, an ASIC) that performs at least a part of the software processes performed in the aforementioned embodiments in hardware may be provided. That is, the execution device 101 or the execution device 301 may have at least one of the following configurations (a) to (c). (a) A processor that performs all the processes in accordance with a program and a program storage device such as a ROM that stores the program are provided. (b) A processor that performs some of the processes in accordance with a program, a program storage device, and a dedicated hardware circuit that performs the other processes are provided. (c) A dedicated hardware circuit that performs all the processes is provided. Here, the number of software processing circuits including a processor and a program storage device or the number of dedicated hardware circuits may be two or more.

In the aforementioned embodiments, the fuel supply system 550 including the cylinder fuel injection valves 44 and the port fuel injection valves 30 as fuel injection valves are exemplified above, but the fuel supply system is not limited to such a configuration. For example, the fuel supply system may include only the port fuel injection valves. For example, the fuel supply system may include only the cylinder fuel injection valves.

The vehicle 500 is not limited to a vehicle in which a device generating a thrust of the vehicle is only an engine, and may be, for example, a series hybrid vehicle. The vehicle may be a parallel hybrid vehicle or a series/parallel hybrid vehicle as well as the series hybrid vehicle.

The fuel temperature Tf is detected by the fuel temperature sensor 137, but the fuel temperature Tf may be acquired by estimation.

What is claimed is:

1. A control device for a fuel supply system, the control device being applied to a fuel supply system including a fuel pump that rotates an impeller in a housing and pumps fuel from a fuel tank and a fuel pipe in which fuel discharged from the fuel pump flows, the control device controlling the fuel pump, the control device comprising:
an execution device; and
a storage device that stores a program of a process which is performed by the execution device,
wherein the execution device performs a coping process of increasing an amount of operation of the impeller when the impeller is deformed and interference with the housing is detected in comparison with a case in which the interference is not detected.

2. The control device for a fuel supply system according to claim 1, wherein the execution device increases the amount of operation of the impeller by increasing a lower limit of a rotation speed of the impeller in the coping process.

3. The control device for a fuel supply system according to claim 2, wherein the execution device ends the coping process and releases the increase in the amount of operation of the impeller when a state in which the interference is detected is resolved by performing the coping process.

4. The control device for a fuel supply system according to claim 1, wherein the execution device stops operating of the fuel pump during stop of fuel injection when the interference with the housing is not detected, and prohibits the operating stop of the fuel pump and allows the impeller to operate continuously without stopping the operating of the fuel pump even during stop of fuel injection as the coping process when the interference with the housing is detected.

5. The control device for a fuel supply system according to claim 4, wherein the execution device releases the prohibition of the operating stop of the fuel pump in the coping process when a state in which the interference is detected is resolved by performing the coping process.

* * * * *